(12) United States Patent
Elliott et al.

(10) Patent No.: US 10,857,552 B2
(45) Date of Patent: Dec. 8, 2020

(54) ELECTROSTATIC PAINTING DEVICE AND METHOD FOR ELECTROSTATIC PAINTING OF WORKPIECES

(71) Applicant: PACCAR Inc, Bellevue, WA (US)

(72) Inventors: Stephen Bennett Elliott, Pilot Point, TX (US); Venkatesh Kannan Srinivasan, Denton, TX (US); Mark Joseph Menzie, Lindsay, TX (US)

(73) Assignee: PACCAR Inc, Bellevue, WA (US)

( * ) Notice: Subject to any disclaimer, the term of this patent is extended or adjusted under 35 U.S.C. 154(b) by 41 days.

(21) Appl. No.: 16/399,733

(22) Filed: Apr. 30, 2019

(65) Prior Publication Data

US 2020/0346230 A1 Nov. 5, 2020

(51) Int. Cl.

| | |
|---|---|
| *B05B 5/043* | (2006.01) |
| *B05B 5/025* | (2006.01) |
| *B25J 11/00* | (2006.01) |
| *B05B 5/057* | (2006.01) |
| *B05D 1/04* | (2006.01) |
| *B05B 5/053* | (2006.01) |

(52) U.S. Cl.
CPC ............ *B05B 5/043* (2013.01); *B05B 5/0255* (2013.01); *B05B 5/053* (2013.01); *B05B 5/057* (2013.01); *B05D 1/04* (2013.01); *B25J 11/0075* (2013.01)

(58) Field of Classification Search
CPC ....... B05B 5/043; B05B 5/0255; B05B 5/057; B05B 5/053; B25J 11/0075; B05D 1/04
USPC ....... 239/3, 690, 695, 708; 361/226–228, 56
See application file for complete search history.

(56) References Cited

U.S. PATENT DOCUMENTS

| | | | | |
|---|---|---|---|---|
| 2,929,982 A | * | 3/1960 | Gormley | .................. B03C 3/66 361/56 |
| 3,379,066 A | * | 4/1968 | Domokos | .............. G01N 33/32 73/866 |
| 4,805,069 A | * | 2/1989 | Nagasaka | ............... B05B 5/032 361/226 |

* cited by examiner

*Primary Examiner* — Steven J Ganey
(74) *Attorney, Agent, or Firm* — Seed IP Law Group LLP

(57) ABSTRACT

An electrostatic painting device capable of reducing any AC or electromagnetic emissions when the device is powered on is provided. The emissions affect electronic components present during painting of various objects or even when the device is powered on. The electromagnetic induction into the conductive circuit elements in turn induces voltages and currents, which potentially harm the micro-electronic circuits. One such device includes a choke between a fluid tip and a high voltage source of the device to reduce these emissions. The voltage source may include at least one capacitor which supplies the AC emissions representing electromagnetic emissions risk during the discharge of paint from the device. The choke connected to the voltage source substantially reduces the emissions involved during the paint discharge, while allowing the discharge of electrons, thereby imparting negative DC charge to the paint and the workpiece, and preventing damage to electronic circuits during the process.

21 Claims, 7 Drawing Sheets

ELECTROSTATIC PAINTING DEVICE AND METHOD FOR ELECTROSTATIC PAINTING OF WORKPIECES

BACKGROUND

Technical Field

The present disclosure pertains to electrostatic painting devices and methods, and more particularly to such devices and methods for reducing electromagnetic emissions and alternating current (AC) anomalies discharged during the electrostatic painting process.

Description of the Related Art

Electrostatic painting is a process that utilizes charged painting particles to paint a workpiece. The paint, which is typically in the form of either powdered particles or atomized liquid, is charged and projected towards a conductive workpiece by electric force. Due to the accuracy and the efficiency in the painting process, the process has a wide application and is also employed in the process of painting vehicle frames (e.g., chassis). In chassis, other electronic circuitry and electronic components may be mounted on the main supporting structure as vehicles nowadays are trending toward relying heavily on the functions operated based on electronic circuits. For example, truck manufacturers typically mount various electronic devices including microelectronic circuits on their vehicles.

However, when the electrostatic painting process is applied to the chassis on which electronic devices are mounted, the microelectronic circuits included in the devices may be affected or disturbed by the electric discharge during the electrostatic painting process. The microelectronics manufacturing industry is constantly seeking to incorporate various electronic devices capable of multiple functionalities to a wide range of applicable industries including truck manufacturers and other vehicle manufacturers. In doing so, the micro-electronics manufacturing industry constantly presses for smaller and smaller electronic device topologies for increased speed and performance. The smaller the element, the lower the breakdown voltage and hence the more prone these smaller electronic devices are to electromagnetic impulses during electrostatic painting. In an extreme case, an integrated circuit chip or multiple IC chips, if exposed to a paint gun emitting electromagnetic emissions, the emissions can cause the electronic devices including these IC chips to fail. That is, depending on the degree of impact of the electric discharge, the functions of the microelectronic circuits may be deteriorated or degraded or in some cases, completely destroyed. In addition, the lifetime of the electronic components included in the microelectronic circuits may be shortened.

BRIEF SUMMARY

Due to the electromagnetic emissions, micro-discharges, or AC anomalies (e.g., abrupt rise in AC currents) present during the discharge of paint particles in the electrostatic painting process, microelectronic circuits mounted on the chassis may be affected by these emissions. In order to reduce the impact of these emissions, an improved electrostatic painting device and method of reducing or eliminating the emissions discharged is provided.

The present disclosure provides a device and method to reduce micro-discharges during electrostatic painting. The direct current (DC) component that is normally output from an electrostatic painting gun is accompanied with spurious discharged AC components and electromagnetic emissions. By utilizing a choke according to the present disclosure, these unwanted electromagnetic emissions, micro-discharges, or AC anomalies may be effectively reduced or eliminated.

In particular, the choke (e.g., a hash choke, a radio frequency choke or the like) is electrically coupled to a fluid tip of an electrostatic painting device (e.g., robotic paint gun, manual paint gun or the like). The choke cancels out any electromagnetic emissions passing through the choke, thereby providing a clean DC voltage at the fluid tip that does not discharge electromagnetic emissions into the workpiece environment.

In at least some embodiments, the choke may be surrounded by insulating materials to ensure that the electromagnetic emissions do not hop around the choke. This additional structure of embedding the choke inside insulative material (e.g., insulative, non-conductive plastic material, insulative grease) helps to prevent emissions from bypassing the choke and discharging into the workpiece environment.

This disclosure provides solutions for preventing the risk of the electronic circuitry from being damaged or negatively affected during the electrostatic painting process.

In particular, a device according to one embodiment of the present disclosure includes a high voltage source that includes an output that provides a direct current (DC) voltage that includes a DC component and a non-DC component. The high voltage source has at least one capacitor. The non-DC components are generated based on the discharge of at least once capacitor of the high voltage source.

The device includes a conductive fluid tip electrically coupled to the output of the high voltage source. In operation, the conductive fluid tip sprays atomized paint particles that are charged using the outputted DC voltage.

The device further includes a choke including an input and an output. The input of the choke is electrically coupled to the output of the high voltage source, and the output of the choke is electrically coupled to the conductive fluid tip. The choke is operable to reduce the non-DC component in the DC voltage provided to the conductive fluid tip to prevent the non-DC components from discharging from the device. In at least one embodiment, the choke is a hash choke. The hash choke has an inductance between 0.1 millihenries and 10 millihenries. In at least one embodiment, the choke includes a core formed with powdered iron. In at least one embodiment, the choke is a radio frequency choke. In at least one embodiment, the choke includes at least one inductor having a number of windings that provide an inductance value between 0.1 millihenries and 10 millihenries. In at least one embodiment, the high voltage source provides a negative DC voltage relative to a grounded object to be painted. The high voltage source provides a negative DC voltage of 60 kV to 140 kV relative to a grounded object to be painted. In at least one embodiment, the high voltage source includes a voltage multiplier. The voltage multiplier includes at least one capacitor, and the non-DC component is created based on a discharge of the capacitor of the voltage multiplier. In at least one embodiment, the non-DC component includes at least one of electromagnetic emissions, AC currents, or micro-discharges. The choke reduces or eliminates the at least one of electromagnetic emissions, AC currents, or micro-discharges. The non-DC component includes frequencies within a range of 10 MHz to 3000 MHz. In at least one embodiment, the high voltage source includes a DC-to-DC converter electrically coupled to a voltage multiplier. The DC-to-DC converter is operable to convert the DC voltage from one voltage level to another voltage level. In at least one embodiment, the device according to the present disclosure is an electrostatic painting gun. In other embodiments, the device according to the present disclosure is an automated electrostatic painting robot or an automated painting system.

The electrostatic painting device may include more than one conductive fluid tip. In at least one embodiment, the conductive fluid tip is a first conductive fluid tip, and the device further includes a second conductive fluid tip proximate to the first conductive fluid tip. The second conductive fluid tip is electrically coupled to the output of the choke.

In at least one embodiment, a tube is further included in the electrostatic painting device. The tube surrounds the choke, and the choke is potted inside the tube and an insulating material filling the void between the tube and the choke.

A device according to another embodiment of the present disclosure includes a high voltage source that includes an output that provides a DC voltage that includes a DC component and a non-DC component. The device includes a first fluid tip electrically coupled to the output of the high voltage source. In operation, the first fluid tip sprays atomized paint particles that are charged using the outputted DC voltage.

The device also includes a second fluid tip proximate to the first fluid tip and electrically coupled to the output of the high voltage source. In operation, the second fluid tip sprays atomized paint particles that are charged using the outputted DC voltage.

The device also includes a first choke connected in series with the first fluid tip and a second choke connected in series with the second fluid tip. The first and second choke includes an input and an output. The input of the first and second choke are electrically coupled to the output of the high voltage source, and the output of the first and second choke are electrically coupled to the first and second fluid tip, respectively.

The present disclosure also provides a method of electrostatic painting. The method includes providing, using a high voltage source, a DC voltage that includes a DC component and unintended non-DC current components, the high voltage source having at least one capacitor, the non-DC current components generated based on the discharge of at least one capacitor of the high voltage source. The method includes limiting the non-DC current components with a choke electrically coupled to the high voltage source. The method includes providing the DC voltage with the reduced non-DC current components to a conductive fluid tip that, in operation, discharges atomized paint particles to apply paint to an object.

In at least one embodiment, the conductive fluid tip is a first conductive fluid tip, and the method further includes providing the DC voltage with the reduced non-DC current components to a second conductive fluid tip proximate to the conductive fluid tip that, in operation, discharges atomized paint particles to apply paint to the object.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known devices or structures associated with electrostatic painting have not been shown or described in detail to avoid unnecessarily obscuring descriptions of the embodiments.

Unless the context indicates otherwise, throughout the specification and claims which follow, the word "comprising" is synonymous with "including," and is inclusive or open-ended (i.e., does not exclude additional, unrecited elements or method acts). Further, the terms "first," "second," and similar indicators of the sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense that is as meaning "and/or" unless the content clearly dictates otherwise.

Figure 1:
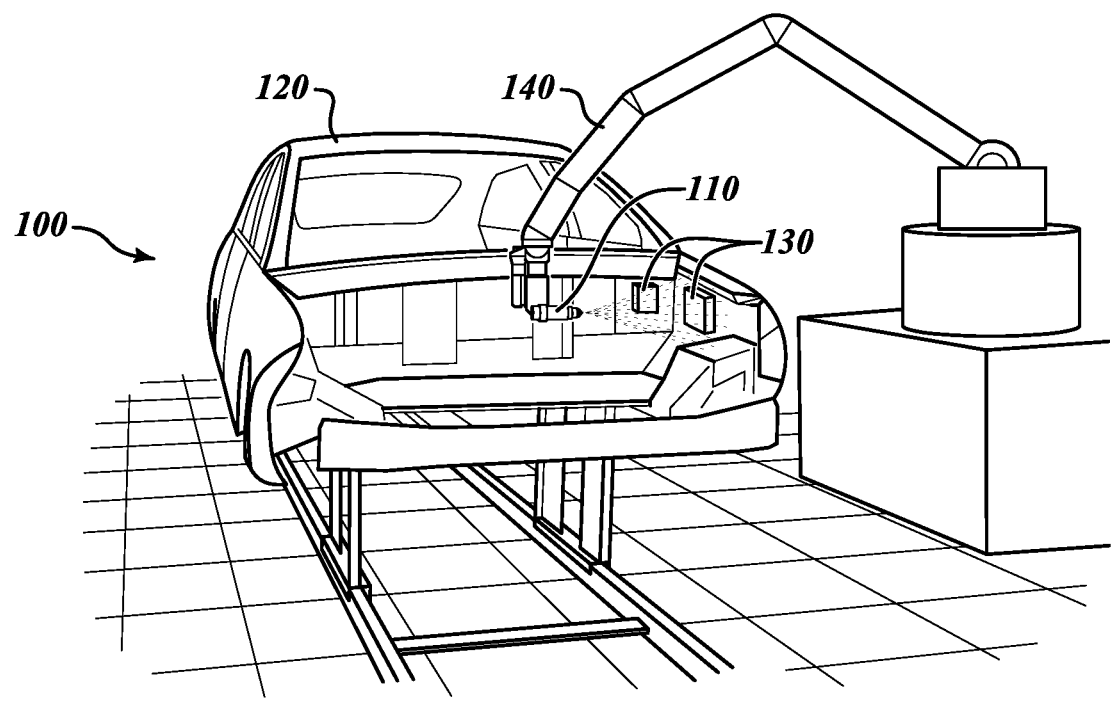
FIG. 1 is a view illustrating an electrostatic painting process using an electrostatic painting device having a choke, in accordance with one or more embodiments of the present disclosure.

FIG. 1 is a view illustrating an electrostatic painting process using an electrostatic painting device 110 having a choke, in accordance with one or more embodiments of the present disclosure.

An electrostatic painting process is the process of charging paint particles to efficiently paint a workpiece. The electrostatic painting process uses a high voltage electrostatic charge to atomized paint particles. Typically, the atomized paint is negatively charged and the workpiece is grounded. An electrostatic field is created between the grounded workpiece and the atomized paint particles which attracts the atomized paint particles to the workpiece. As a result of the electrostatic attraction, the paint particles wrap around the workpiece and efficiently paint the workpiece. The electrostatic painting process is beneficial in that it reduces wasteful overspray and shows high transfer efficiency.

In FIG. 1, the electrostatic painting device 110 is connected to a robotic arm 140. The electrostatic painting device 110 sprays paint to a vehicle frame 120 located in a booth environment 100. In this example, the vehicle frame 120 is a chassis or a skeleton of a vehicle. In FIG. 1, for example, the vehicle frame 120 is a chassis of a car. In other examples, the type of vehicle frame 120 being painted may include a chassis of a truck. However, the workpiece being painted can be any kind of workpiece for which electrostatic painting is needed and appropriate, e.g., motorcycles, boats, ships, aircrafts, large construction machinery, etc. and is not necessarily limited to the foregoing examples.

As explained above, the vehicle frame 120 in the booth environment 100 is grounded during the electrostatic painting process to attract charged atomized paint particles to the workpiece (e.g., the vehicle frame 120). In one or more embodiments, the electrostatic painting device 110 includes a painting gun, paint sprayer or any other suitable device capable of spraying paint. Electrostatic painting systems are designed to utilize the current flow from a negative potential to a positive potential where electron flow is important in creating a negative cloud that sweeps the paint particles to the workpiece. Based on this principle, in one embodiment, the electrostatic painting device 110 sprays paint through a conductive fluid tip where the paint particles are generally negatively charged so that the paint is attracted to the grounded vehicle frame 120. In other embodiments, the atomized paint particles are positively charged and the vehicle frame 120 is connected to a higher positive potential capable of attracting the positively charged paint particles.

The electrostatic painting device 110, as shown in FIG. 1, is connected to the robotic arm 140. The electrostatic painting device 110 coupled to the robotic arm 140 or any automated device may be used in environments involving mass production. However, in other embodiments, the electrostatic painting device 110 is manufactured to be used manually or hand-held. In embodiments where the electrostatic painting device 110 is manufactured to be hand-held, the size of painting device 110 is typically smaller than the size of the robotic painting gun devices as shown in FIG. 1. The miniature size of the hand-held device causes each of the components in the painting device 110 to have smaller sized components. While relatively small sized hand-held devices still exhibit emissions, the amplitude of the emissions discharged are smaller in amplitude because a voltage cascade in the hand-held device is physically smaller. The physically small cascade inside the device leads to a smaller capacitive buildup. In one or more embodiments, the electrostatic painting device 110 is connected to a paint supply line and a power supply. For example, the power supply includes high voltage cables. However, the power supply can also include voltage power source generated locally to feed the high voltages to the painting device 110.

Other suitable components may be included in the electrostatic painting device 110 including an air supply, pressure supply line, etc. For example, an electrostatic painting gun can have a low voltage electrical supply, multiple air supplies, and a fluid line.

Vehicles in the current era utilize various electronic components to enhance customer's user experience and provide multiple functionalities. In particular, the current and future trend is toward the incorporation and integration of microelectronic devices (e.g., sensors) and subsystems (e.g., microcontroller based solenoid bank), and systems (e.g., vehicle electronic control unit) on products and systems undergoing electrostatic painting. However, the discharge of paint spray gun based on conventional electrostatic painting devices creates electromagnetic emissions that have negative impacts on electronic components 130 mounted on the vehicle frame 120.

There are frequent micro-discharges, electromagnetic emissions, alternating current (AC) anomalies, etc., in the booth environment 100 when the electrostatic field is generated. These components that are not direct current (DC) components, or "non-DC components," have the energy necessary to harm, for example, sensitive low voltage solid state micro-circuits. While "electro-static" painting in theory is not supposed to generate significant electromagnetic energy, during the actual painting process, a significant amount of energy is present and may negatively impact the electronic components 130. Further, in one or more situations, the electromagnetic energy is emitted even when the electrostatic painting device 110 is not in use. For example, the energy emission occurs when the paint is not being sprayed such as when the painting device 110 is powered up. That is, the emissions can be radiated even when the device is powered up. Further, the emissions can be radiated even while the robot or the robotic arm 140 moves to another zone to be sprayed.

Microelectronics are sensitive to electrostatic discharge and electromagnetic interference. For example, the electromagnetic energy discharged during the painting process can induce current into conductive elements of the various electronic components 130. These electromagnetic energy discharges or micro-discharges may directly strike components or connectors that are connected to the electronic components. Further, depending on the amount of energy discharged, the electronic circuitry can undergo some meltdown in the circuit components thereby destroying the circuit component.

The electrostatic painting device 110 according to the present disclosure addresses the micro-discharge problem involved during the electrostatic painting process by incorporating at least one choke inside the electrostatic painting device 110. The details of the choke are described below with reference to the figures.

Figure 2A:
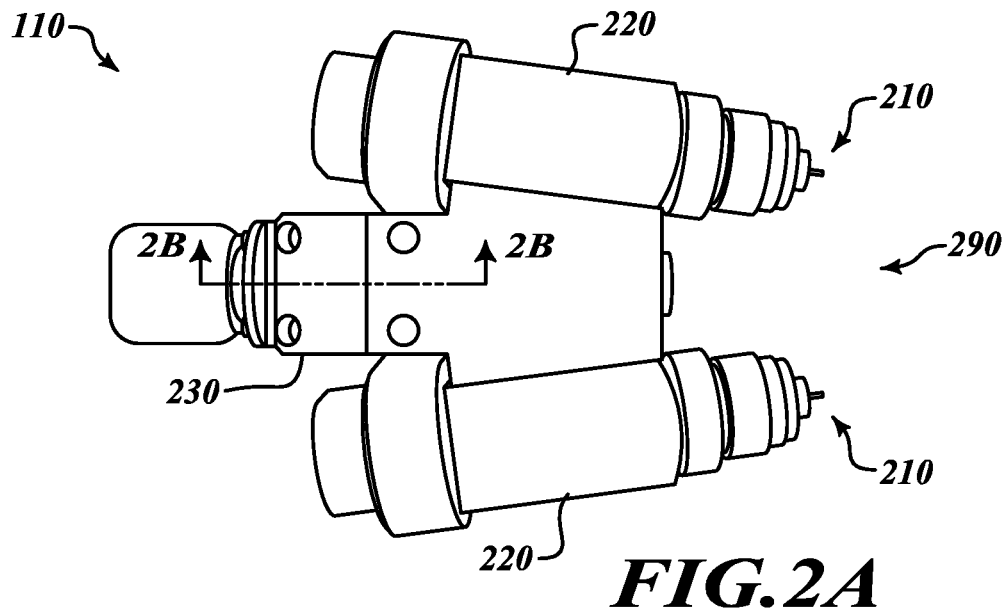
FIG. 2A is a top view of the electrostatic painting device with two fluid tips shown in FIG. 1, in accordance with one or more embodiments.

FIG. 2A is a top view of the electrostatic painting device 110, which includes two fluid tips. FIG. 2A illustrates a spray gun portion 290 of the electrostatic painting device 110. Well-known structures associated with the electrostatic painting device 110 have not been shown or described in detail to avoid unnecessarily obscuring descriptions of the embodiments according to the present disclosure.

The top view of the electrostatic painting device 110 shows conductive fluid tips 210, cases 220, and a manifold 230. The manifold 230 is connected to the two cases 220 for the dual conductive fluid tips 210. In other embodiments, the electrostatic painting device 110 can be manufactured with a single fluid tip or more than two fluid tips based on industrial needs.

The fluid tip 210 is configured to spray the charged paint particles to the workpiece, e.g., the vehicle frame 120 (FIG. 1), placed in the booth environment 100. For charging the paint fluid (liquid or powders), direct charging, tribo charging, post-atomization charging or any other charging methods may be utilized to charge the paint particles supplied from the paint supply. In the paint atomization process, an air supply or a pressure supply or any other means for atomizing the paint fluid to paint droplets (or paint particles) may be utilized. Here, the atomization refers to the process of breaking up liquids into droplets and a droplet is a small particle of liquid having a more or less spherical shape.

In at least one embodiment, by using pressure atomization, the paint fluid is compressed and atomized into paint particles and the atomized paint particles come into contact with an electrostatic field downstream near the fluid tip 210 for charging. The electrostatic field may be created by electrostatic induction or corona, or by one or more electrodes (electrode ring, mesh, or grid). In other embodiments, the conductive fluid tip 210 is connected with the high voltage source to charge the paint particles. When the atomized paint particles are made to be electrically charged, they repel from each other and spread themselves evenly as they exit the fluid tip 210.

The potential at the fluid tip 210 of the electrostatic painting device 110 changes dramatically with each discharge. For example the potential at the fluid tip 210 drops from the operating voltage of about 100 kV to near zero volts. As the discharges are frequent, the voltage at the fluid tip 210 during operation can be ranging from near zero volts to about 100 kV. The voltages as indicated in the present disclosure may have a negative polarity or a positive polarity. A positive voltage does not necessarily mean that the voltage has a positive value. That is, 100 kV can also refer to a +100 kV as well as a −100 kV in one or more embodiments.

Figure 2B:
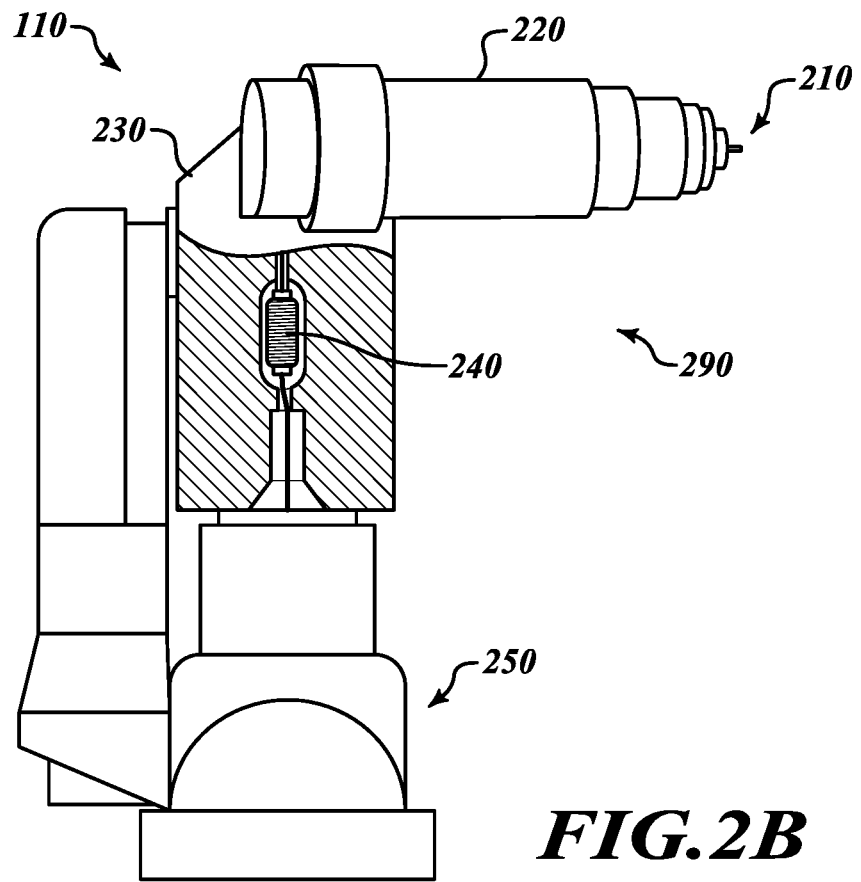
FIG. 2B is a side view of the electrostatic painting device taken substantially along the cut-line 2B-2B of FIG. 2A, illustrating further details of the choke of the device, in accordance with one or more embodiments.

The manifold 230 houses a choke 240 (FIG. 2B) that reduces micro-discharges emitted which is explained in more detail in relation to FIG. 2B.

FIG. 2B is a side view of an electrostatic painting device 110 taken along the cut-line 2B-2B of FIG. 2A, illustrating further details of the choke 240 of the device, in accordance with one or more embodiments.

The choke 240 is an inductor or a coil that is used to block high-frequency while passing low-frequency of AC or DC in an electrical circuit. A choke usually includes a coil of insulated wire often wound on a magnetic core, although there may be various other ways to form a choke. The choke's impedance increases with frequency based on the following impedance formula of an inductor $Z=jwL$ ($Z$=impedance, $w$=frequency, $L$=inductance value) or the formula for inductive reactance $X_L=2\pi fL$. However, the choke's low electrical resistance passes both AC and DC with little power loss, but its reactance limits the amount of AC passed.

In one or more embodiments, the choke 240 is formed using coils wound on a core. The choke 240 is useful for suppression of electromagnetic interference and radio frequency interference from high voltage source, power supply lines or the like, and for prevention of malfunctioning of electronics devices. That is, the choke 240 of the present disclosure is used to remove or decrease electromagnetic interference generated by a paint applicator system that employs the electrostatic painting device 110.

In one or more embodiments, the choke 240 includes a radio frequency choke (RF choke). RF chokes are designed to block radio frequencies while allowing DC to pass. By housing an RF choke inside the manifold 230, the electrostatic painting device 110 may reduce the amplitude of the AC signal during the discharge of the paint particles. RF chokes, according to at least one embodiment, have iron powder or ferrite cores which increases inductance and overall operation. In other embodiments, RF chokes for even higher frequencies have non-magnetic cores and low inductance. A typical RF choke value that could be used may have a value ranging between about 0.5 mH (millihenries) to about 10 mH, for example. However, the number of windings on the core and the material of the core of the RF choke may vary to meet the inductance value as mentioned above. For example, the choke 240 may include at least one inductor having a number of windings that provide an inductance value between 0.1 millihenries and 10 millihenries. Further, depending on the parameters involved in the electrostatic painting device 110, the inductance value of the RF choke may have other numerical range than having values between about 0.5 mH to about 10 mH. Further, in some embodiments, RF chokes placed near the fluid tip 210 may have a better effect in minimizing emissions. However, the location of the choke is not necessarily confined to the location near the fluid tip 210. Further configuration of the choke 240 will be explained in further detail with FIGS. 3A, 3B, 4, and 5.

In one or more embodiments, the choke 240 includes a hash choke that has a molded powdered iron core. As an example, the hash choke may have an inductance having values between about 0.5 mH to about 10 mH (e.g., 1 mH). The choke 240 is electrically coupled between a high voltage cascade and the fluid tip 210.

The purpose of the choke 240 is to prevent a rise in AC current, allowing the DC potential to be presented to the fluid tip 210 where paint is exposed to the minus 100 kV DC potential (100 kV), but not allowing discharge caused by the capacitor of the high voltage cascade into the booth environment 100. The choke 240 itself is shielded from the booth environment 100 by embedding it in an insulative material (e.g., dense non-conductive plastic). In other embodiments, the manifold 230 housing the choke 240 is formed using insulated, non-conductive material to captivate any electromagnetic emissions and AC anomalies from escaping the electrostatic painting device 110 to the booth environment 100. This is explained in more detail below in relation to FIGS. 3B, 3C, 3D, and 3E.

Figure 3A:
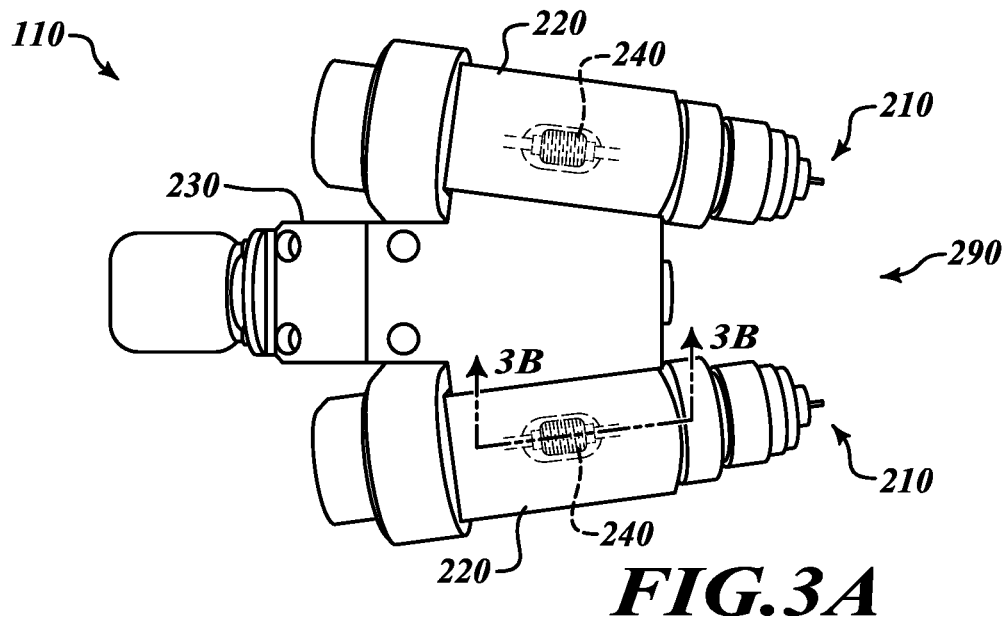
FIG. 3A is a top view of the electrostatic painting device with two fluid tips each having a choke, in accordance with one or more embodiments.

FIG. 3A is a top view of an electrostatic painting device 110 with two fluid tips each having a choke, in accordance with one or more embodiments. FIG. 3A illustrates a spray gun portion 290 of the electrostatic painting device 110. In this embodiment, a separate choke 240 is housed in each case 220 of the electrostatic painting device 110. The dual conductive fluid tip 210 has a choke on each side of the case 220 so that any AC emissions or AC bursts with very fast rising edges are effectively reduced or eliminated for each fluid tip 210. After the reduction or elimination of any AC bursts during the discharge in the electrostatic painting process, the conductive fluid tip 210 is maintained at a static DC voltage that does not have a negative impact on the electronic circuitries mounted on the vehicle frame 120. As explained elsewhere herein, these AC events present electromagnetic impulses and risk of induction to the electronic components 130 which may partially or completely destroy the functions of the electronic components 130. By incorporating one or more chokes in the electrostatic painting device 110, the sharp rise and fall of the discharges coming out of the fluid tip can be removed. The choke applied at the fluid tip yields a more constant DC potential or a more evenly distributed charge to the workpiece. This constant DC potential created using the choke does not affect the electronic components 130 by inducing any energy to the electronic circuitries which produces an advantageous effect compared to the conventional electrostatic painting guns.

Figure 3B:
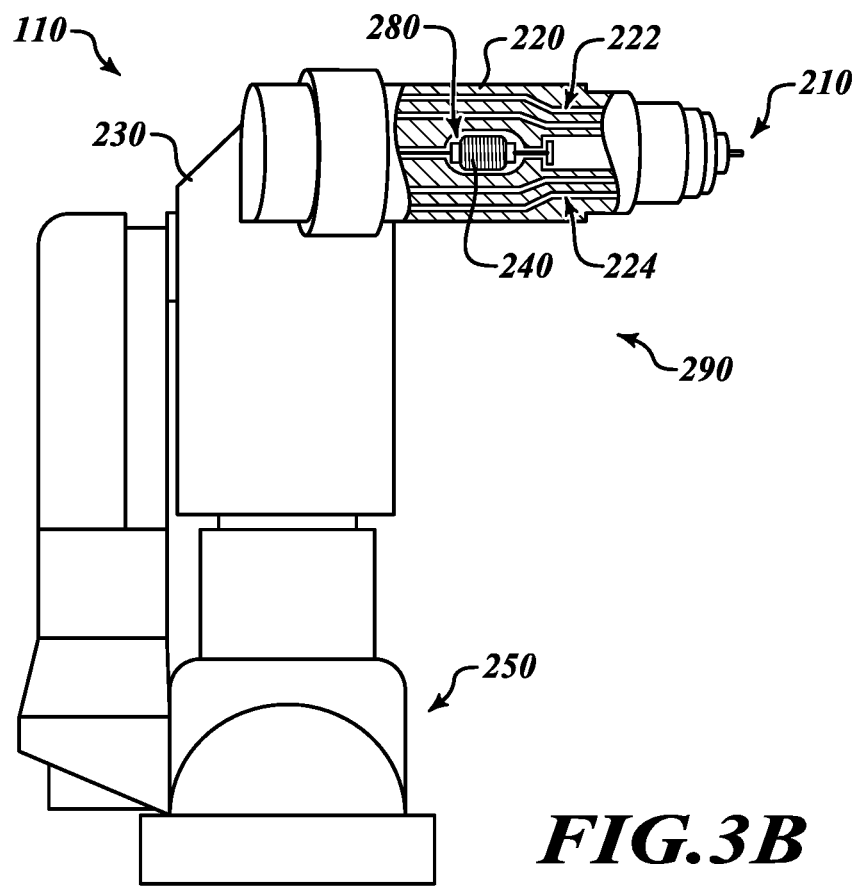
FIG. 3B is a side view of an electrostatic painting device taken along substantially the cut-line 3B-3B of FIG. 3A, in accordance with one or more embodiments.

FIG. 3B is a side view of the electrostatic painting device 110 taken along the cut-line 3B-3B of FIG. 3A, in accordance with one or more embodiments.

When the choke 240 is housed in the manifold 230 in accordance with the configuration illustrated in FIGS. 2A and 2B, there may be a single choke 240 that is connected to both fluid tips 210. However, in this embodiment, the choke 240 is housed in the case 220 instead of the manifold 230. In this example, each choke 240 is connected to the fluid tip 210 in one of the cases 220. In some embodiments, when the choke 240 is housed in each of the cases 220 located closer to the fluid tip 210, the suppression of electromagnetic interference may be increased and risk of incurring harm to electronics devices may be decreased.

The type of choke 240 may include RF chokes or hash chokes having similar characteristics or property as explained in connection with FIGS. 2A and 2B. However, in other embodiments, inductors having a core with wounded wires can also be used to achieve the same function as the aforementioned chokes by changing the number of windings around the core and by changing the material of the core and so forth. In some embodiments, each of the chokes 240 housed in each case 220 has the same value. In other embodiments, each of the chokes 240 housed in each case 220 may have a different value from each other to meet certain design needs. As mentioned, the purpose of incorporating the choke 240 is to prevent or reduce a rise in AC currents, AC bursts, electromagnetic interferences, electromagnetic emissions, or micro-discharges affecting the electronic components 130 into the booth environment 100. To further this purpose, the choke 240 may have an additional insulating capsule 280 surrounding it. For example, the insulating capsule 280 can surround the choke 240. In other examples, the insulating capsule 280 can surround the choke 240 as well as the input wiring of the choke 240 and the output wiring of the choke 240. The insulating capsule 280 can be made of any appropriate insulating material suitable to prevent or reduce the likelihood of AC emissions hopping around the choke 240 and into the booth environment 100.

In further embodiments, the outer housing of electrostatic painting device 110 may be coated with dense non-conductive plastic material to contain the AC emissions from escaping through the fluid tip 210.

In one or more embodiments, the fluid tip 210 may be connected with various supply lines 222 and 224. For example, these supply lines may be air supply lines, paint supply lines or power supply lines or any other lines suitable for electrostatic painting device 110 to operate.

Figure 3C:
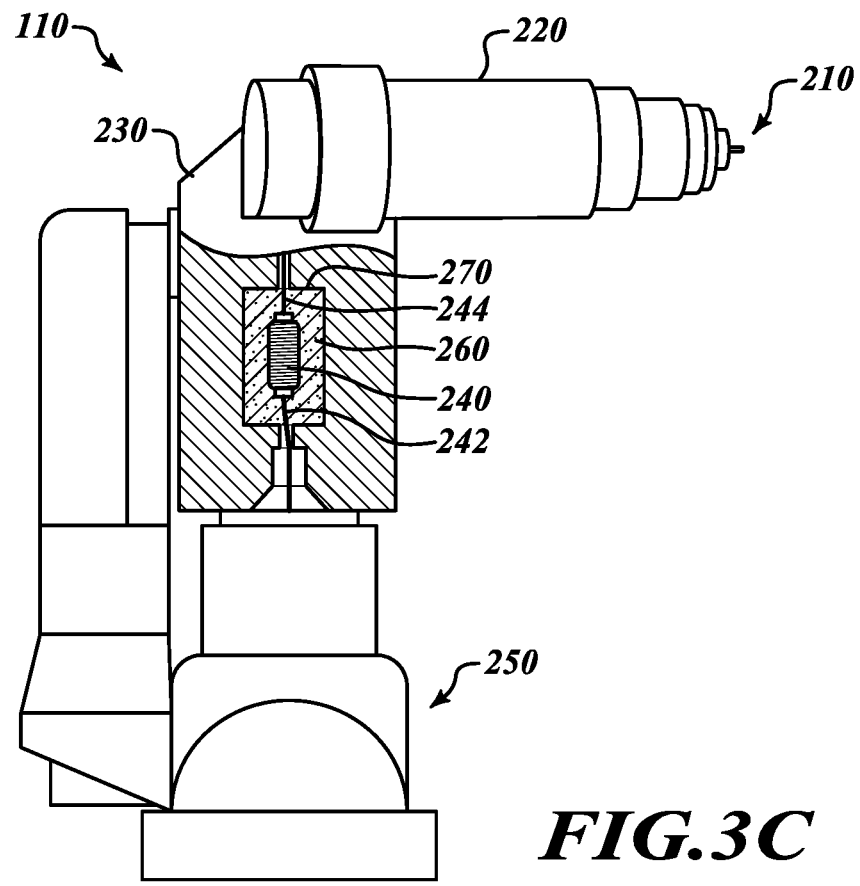
FIG. 3C is a side view of the electrostatic painting device taken along substantially the cut-line 2B-2B of FIG. 2A showing details of the choke with surrounding materials, in accordance with one or more embodiments.

FIG. 3C is a side view of an electrostatic painting device taken along the cut-line 2B-2B of FIG. 2A showing details of the choke with surrounding materials, in accordance with one or more embodiments.

In FIG. 3C, a tube 270 surrounds the choke 240. The tube 270 is loaded with insulative material 260. In at least one embodiment, the insulative material 260 is insulative grease, insulative plastic, silicone grease, dielectric grease, rubber, insulating fluids, liquid silicone rubber or the like. The choke 240 is positioned within the tube 270 and a cavity portion between the tube 270 and the choke 240 is packed with the insulative grease. In one embodiment, the insulative grease covers substantially all of the surface of the choke 240. In other embodiments, the insulative grease covers substantially all of the surface of the choke 240 as well as an input wiring 242 and an output wiring 244 of the choke 240. Covering the choke 240 and its input/output wiring 242 and 244, further ensures the electromagnetic emissions do not bypass the choke 240 and into the fluid tip 210. The tube 270, which is loaded with insulative grease, may prevent electromagnetic emissions from hopping around the choke 240 and finding their way to the booth environment 100. In at least one embodiment, the tube 270 is insulating ceramic materials, insulative plastic (e.g., PVC, Cresyl Pthalate, DEHP, etc.), glass, rubber, etc. In at least some embodiments, the same substance used for the insulative material 260 can be used for the material of the tube 270.

Figure 3D:
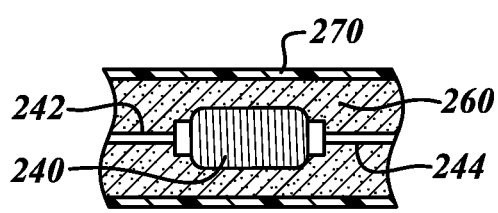
FIG. 3D is an enlarged view of a tube surrounding a choke of an electrostatic painting device, in accordance with one or more embodiments.

FIG. 3D is an enlarged view of a tube surrounding a choke of an electrostatic painting device, in accordance with one or more embodiments. The tube 270 houses a choke 240. The cavity formed between the tube 270 and the choke 240 is filled with insulative material 260. In this embodiment, the insulative material 260 covers substantially all of the surface of the choke 240 and the input and output wiring 242 and 244 of the choke 240. In some cases, the electromagnetic emissions may bypass the choke 240 and find their way to the booth environment 100 if the input/output wirings 242 and 244 are not covered using the insulative material 260. For example, the insulative grease may harden inside the tube 270 once it stably fixes the position of the choke 240 as well as its input/output wiring. In one embodiment, the tube 270 surrounds the choke 240 using an insulative plastic or any non-conductive plastic that may additionally keep the electromagnetic emissions from hopping around the choke 240. In further embodiments, the choke 240 is potted inside the tube 270 filled with insulative grease to fix the location within the tube 270. The potted choke 240 keeps the electromagnetic emissions from escaping the choke 240 and into the booth environment 100 through the fluid tip 210.

Figure 3E:
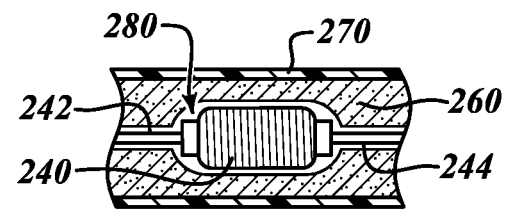
FIG. 3E is an enlarged view of a tube surrounding a choke having an insulating capsule, in accordance with one or more embodiments.

FIG. 3E is an enlarged view of a tube surrounding a choke having an insulating capsule, in accordance with one or more embodiments.

In order to prevent electromagnetic emissions and AC anomalies from escaping the electrostatic painting device 110 to the booth environment 100, the choke 240 may be initially surrounded by an insulating capsule 280 which is further surrounded by insulating materials 260. In one embodiment, the insulating capsule 280 can surround the choke 240 with any suitable non-conductive materials to fix the position of the choke 240. By adding an insulating capsule around the choke 240, the choke itself is shielded from the booth environment 100. In this embodiment, the choke 240 may be additionally embedded and housed in the tube 270 that is formed of dense non-conductive plastic and having insulative grease in between the tube 270 and the insulating capsule 280. In at least one embodiment, the materials for the insulating capsule 280 may be of insulative plastic or any non-conductive plastic, silicone grease, dielectric grease, rubber, insulating fluids, liquid silicone rubber or the like. That is, in at least some cases, the materials used for the insulating capsule 280, the insulating material 260, or the tube 270 may overlap. In other cases, all of the materials used for the insulating capsule 280, the insulating material 260, or the tube 270 may differ from each other. This double or triple insulation structure can further reduce or eliminate any AC emissions from hopping around or bypassing the choke 240.

Figure 4:
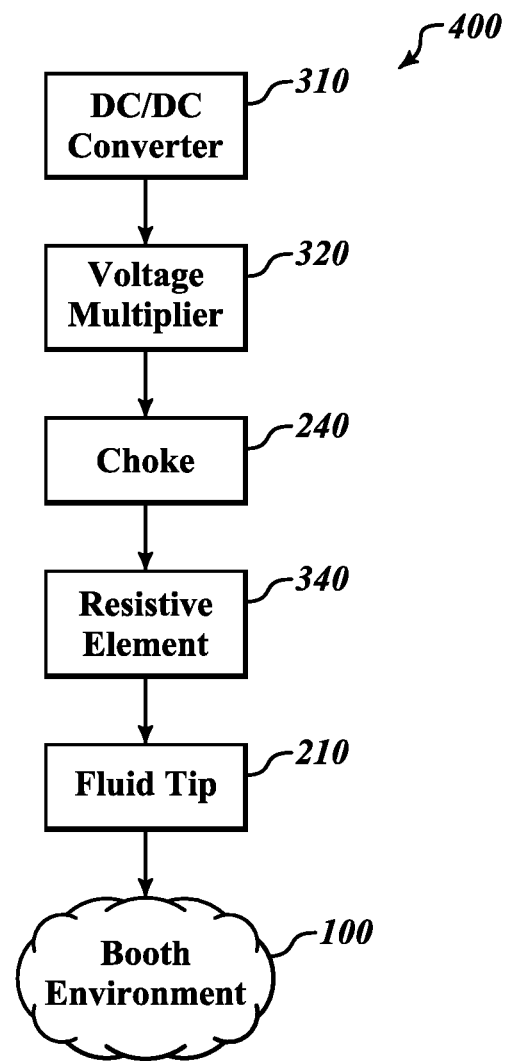
FIG. 4 is a schematic diagram of the components of the electrostatic painting device, in accordance with one or more embodiments.

FIG. 4 is a diagram of the components of the electrostatic painting device, in accordance with one or more embodiments.

As briefly explained in connection with FIG. 1, the electrostatic painting process may include charging atomized paint at a nominal voltage, e.g., minus 100 thousand volts. The charge aids in the paint particles being attracted to the grounded object being painted, due to the nominal voltage and ground being of different electric potential. These values are for example and any values may be used as long as the potential yields the required outcome, this being attraction of paint particles to the object being painted with necessary coverage. The electrostatic painting device typically employs a DC-to-DC converter (or DC/DC converter) followed by a voltage multiplier, multiplication ultimately yielding the desired potential at the point of application where the paint is atomized, and atomized particles picking up charge as paint flows out of the fluid tip of the device.

Returning to the figures, in FIG. 4, the electrostatic painting device according to the present disclosure includes a DC/DC converter 310, a voltage multiplier 320, a choke 240, a resistive element 340, and a fluid tip 210. Other well-known structures associated with the electrostatic painting device have not been shown or described in detail to avoid unnecessarily obscuring descriptions of the embodiments according to the present disclosure.

The DC/DC converter 310 is an electronic circuit or device that converts a direct current (DC) source from one voltage level to another, and is a type of electric power converter. This is one example of a high voltage source. In one embodiment, the DC/DC converter 310 may have a voltage range between about 0 V to 21 V (DC). The current in the DC/DC converter 310 may be limited to a particular value of about 200 µA, for example. However, the current of the DC/DC converter 310 can be limited to other suitable values for example, 110 µA (DC), for various reasons including design requirements, safety requirements, etc. However, based on different parameters and according to different industrial needs, the parameters of the DC/DC converter 310 may vary in range. The DC/DC converter 310 may be connected to a power supply line to receive power therefrom.

The voltage cascade or voltage multiplier 320 is connected to the output of the DC/DC converter 310. A voltage multiplier is an electrical circuit that converts electrical power from a lower voltage to a higher DC voltage, typically using a network of capacitors and diodes. The voltage multiplier 320 receives the voltage output from the DC/DC converter 310 and increases this voltage up to a high voltage potential (e.g., negative 100 kV, negative 60 kV-140 kV, etc.). The voltage multiplier 320 can be one example of a high voltage source together with the DC/DC converter 310. In other embodiments, a high voltage source can include any other suitable power source capable of supplying high voltage for charging the paint particles.

The capacitors included in the voltage multiplier 320 gives rise to the electromagnetic emissions, which are AC anomalies present in the booth environment 100. In some situations, the emissions may be present but the emissions itself may not show random pulsating manners. The charging and discharging of the capacitor in the voltage multiplier 320 cause the electromagnetic emissions to exhibit random pulsating manners. The voltage multiplier 320 appears to the booth environment 100 as a capacitor with an extremely high potential. Further, a paint booth environment can appear to the capacitor as an infinite number of paths to ground. These paths individually may have very high impedance (e.g., giga Ohms each). However, when enough parallel paths to ground emerge, the capacitor discharges which creates a micro-discharge that is not visible as an arc but contains enough energy to harm low voltage semiconductor devices or the like. Further, when the voltage multiplier 320 charges up to its DC potential, it discharges when parallel paths overcome the breakdown potential of air, for example 3 kV/mm. In addition, field intensity is generally cone shaped and aimed at the vehicle frame 120 (FIG. 1) but is not confined to the cone and it may have spherical shapes. Where the robotic arms 140 that discharges electric fields overlap, the spheres overlap as well and create potential for twice the emissions. In these situations, the energy delivered to the booth environment 100 is increased and the electronic components are more likely to be harmed by the increase energy and electromagnetic emissions. These emissions have been shown to have very fast rising edges (e.g., 2 ns) followed by an exponential decay as would be expected of the discharge of a capacitor across a gap. A 2 ns rise time yields a predominant frequency of 500 MHz (f=1/T). Examples of electromagnetic emissions discharged into the booth environment 100 are illustrated in FIG. 6B.

The output of the voltage multiplier 320, therefore includes both a DC component and a non-DC current component. However, by applying a choke 240 between the output of the voltage multiplier 320 and the fluid tip 210, the choke 240 can effectively reduce the non-DC current components that have the potential to damage low voltage microelectronic devices during the painting process. For example, by closely coupling the choke 240 to the output of the voltage multiplier 320 can help effectively filter out the non-DC current components. In one embodiment, the choke has an inductance value of 1 mH. The impedance value Z of the hash choke at 500 MHz is $X_L$=3.14MΩ (Z=jwL, w=2πf, $X_L$=2πfL). This is one example value of the inductance of the choke but other chokes having different inductance values can be utilized. By incorporating the choke, the choke can reduce or eliminate harmful problematic emissions, micro-discharges that impact the electronic components. The choke allows low voltage semiconductor based electronic components, devices, subsystem and systems to be painted electrostatically without any risk or harm due to electromagnetic emissions. In at least one embodiment, the non-DC component includes frequencies within a range of about 10 MHz to 3000 MHz. However, depending on the various specification requirements of the electrostatic painting device 110 and the various components therein, the range of the frequencies of the non-DC components may vary beyond the aforementioned range.

In other embodiments, RF chokes or other chokes with different inductance value may be used to achieve the same outcome of reducing micro-discharges. As explained previously, in at least some implementations the chokes according to the present disclosure utilize chokes with a core having wound coils around it. Depending on the overall resistance value of the painting device, and the frequency rate of the micro-discharges detected, the number of windings on the core and the type of the core used can be varied and does not necessarily require the parameters as indicated in one of the embodiments. In at least some embodiments, the core of the choke can be use with molded powdered iron core or ferrite cores or the like.

Yet in further embodiments, the choke 240 can be part of the voltage multiplier 320 to filter out the micro-discharges originating from the capacitors in the voltage multiplier 320.

The choke 240 is connected to a resistive element 340. In one embodiment, the choke 240 is connected to a series of resistive elements. In other embodiments, the choke 240 can be connected with the resistive element 340 in a parallel manner based on the design of the electrostatic painting device 110. The resistive element 340 or the resistors are present to limit the current that the voltage multiplier 320 can emit into the painting environment. For example, the presence of the resistors helps prohibit possible arcing in the painting environment. In some embodiments, the resistive element 340 represents the resistance value included in the electrostatic painting device 110. For example, the resistive element 340 is the sum of the resistance in the case 220, the resistance in the manifold 230, and the resistance in any other components such as the cascade or any other resistances between each of the components. In other embodiments, resistance is inherent in every component and accordingly the resistive element 340 does not have to be a separate, independent resistance located between the fluid tip 210 and the choke 240. In further embodiments, the choke 240 is located between the fluid tip 210 and the resistive element 340. In some embodiments, the resistive element 340 can be simply omitted or placed in a different suitable location.

The fluid tip 210 is connected to the choke 240 or the resistive element 340 and discharges the negatively charged paint particles to the booth environment 100. The fluid tip 210 may be connected to a paint supply and any other supplies needed for the electrostatic painting process. The paint supply connected to the fluid tip 210 is atomized and charged with the voltage output from the choke 240 and the voltage multiplier 320. The voltage value at the fluid tip 210 may vary from 0 V to 100 kV DC. The DC current at the fluid tip 210 may exhibit a maximum value of 200 µA which may vary from 0 A to 200 µA depending on the specification of the electrostatic painting device 110.

As identified previously, one of the sources of the electromagnetic emissions comes from the capacitors in the voltage multiplier 320. In this regard, in one or more embodiments, the choke 240 may be closely coupled to the voltage multiplier 320 to have a good efficiency in reducing or eliminating micro-discharges originating from the voltage multiplier 320. For example, the choke 240 may be electrically coupled to the output of the voltage multiplier 320. However, depending on the design of the electrostatic painting device 110, the location of the choke 240 may vary.

Figure 5:
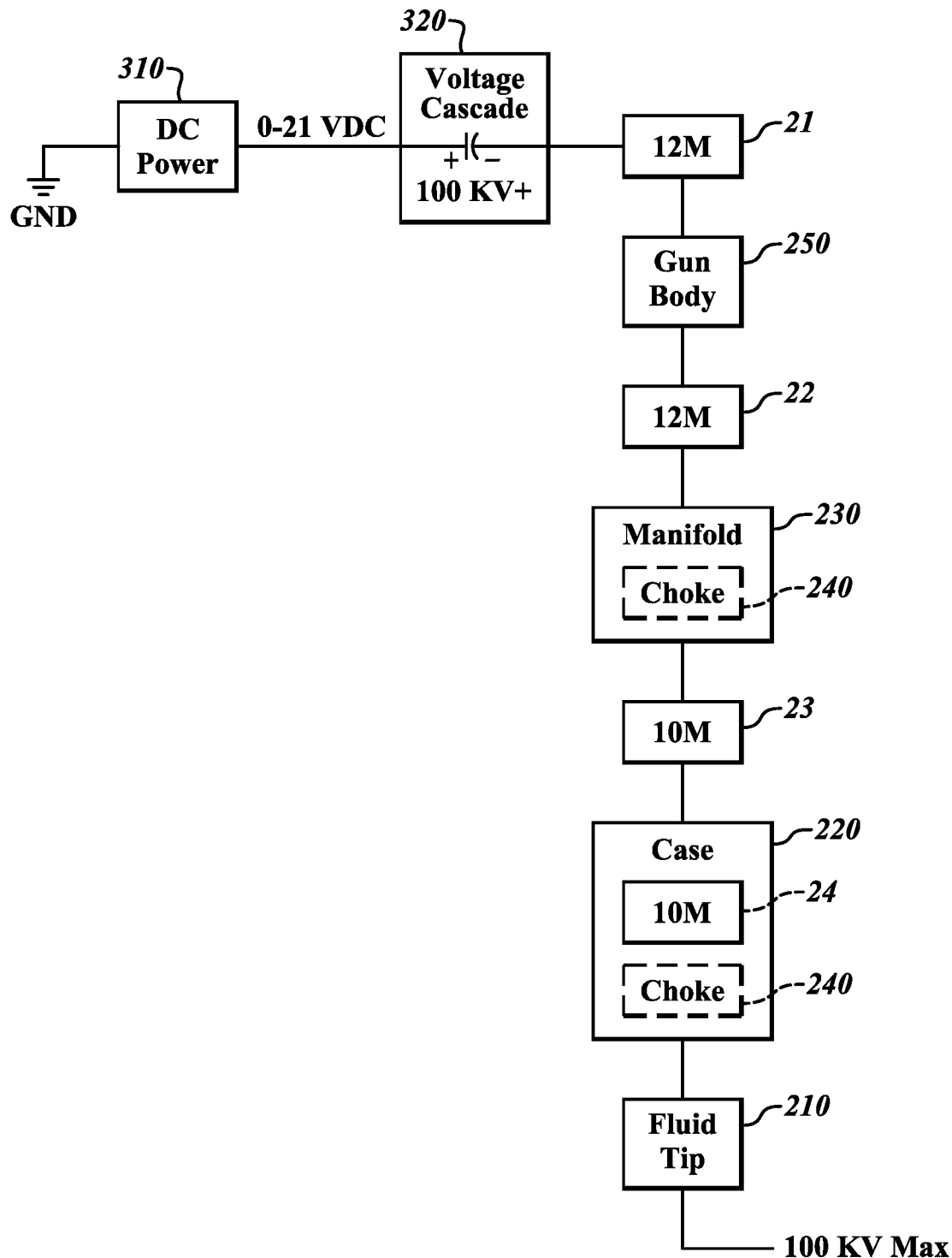
FIG. 5 is an exemplary realistic model of the electrostatic painting device, in accordance with one or more embodiments.

FIG. 5 illustrates one embodiment of a realistic model of the electrostatic painting device 110. The electrostatic painting device 110 includes a DC power source 310, a voltage cascade 320, a first 12 MΩ impedance 21, a gun body 250, a second 12 MΩ impedance 22, a manifold 230, a third 10 MΩ impedance 23, a case 220, a fourth 10 MΩ impedance 24, a choke 240, and a fluid tip 210.

The DC power source 310 is an example of a high voltage source. The DC power source 310 may include a DC/DC converter as shown in FIG. 4. In one embodiment, the DC power source 310 may have a voltage range between about 0 V to 21 V (DC). In this embodiment, the DC power source 310 is connected to ground. The ground, for example, has 0 V potential. In some embodiments, the current in the DC power source 310 may be limited to 110 µA (DC), for example. However, the system itself may be capable up to 200 µA or other suitable value. However, based on different parameters and according to different industrial needs, the parameters of the DC power source 310 may vary in range.

The voltage cascade or the voltage multiplier 320 is connected to the DC power source 310. The voltage cascade 320 receives the voltage output from the DC power source 310 and increases this voltage up to about 100 kV potential. As explained in connection with FIG. 4, the voltage cascade 320 includes at least one capacitor and these capacitors give rise to the electromagnetic emissions, which are AC anomalies present in the booth environment 100. The output of the voltage cascade 320 includes both a DC component and a non-DC component.

The output of the voltage multiplier or cascade 320 is provided to the gun body 250. The gun body 250, also shown in FIG. 2B, is the outer housing of the electrostatic painting device 110. In one embodiment, the gun body 250 includes a handle portion for users to grab the gun body when using manually for painting. Although not explicitly shown in FIGS. 2B and 3B, the gun body 250 is connected to other suitable or necessary components of the electrostatic painting device 110. For example, the gun body 250 is connected to the voltage cascade 320 and the DC power source 310 and any other elements of the electrostatic painting device 110 not shown in the figures. In further embodiments, the choke 240 can be located in the gun body 250 and positioned closely to the voltage cascade 320. In yet further embodiments, the choke 240 can be additionally or alternatively located in either the manifold 230 or the case 220 or both to ensure the reduction of AC emissions.

A first 12 MΩ impedance 21 is connected between the voltage cascade 320 and the gun body 250. This is one exemplary impedance value shown that may exist between each of the components of the electrostatic painting device 110. That is, a second 12 MΩ impedance 22 connected between the gun body 250 and a manifold 230; a third 10 MΩ impedance 23 connected between the manifold 230 and a case 220; and a fourth 10 MΩ impedance 24 included as a resistance within the case 220, are all non-limiting exemplary impedance values that may exist within the electrostatic painting device 110. The resistive element 340 of FIG. 4 indicates the collective value of these resistances within the electrostatic painting device 110. For example, the series resistance would be an impedance value of 44 MΩ by adding up the first 12 MΩ impedance 21, the second 12 MΩ impedance 22, the third 10 MΩ impedance 23, and the fourth 10 MΩ impedance 24.

As explained in connection with embodiments related to FIGS. 2A, 2B and 3C, a choke 240 may be included inside the manifold 230. However, in other embodiments, the choke may be included inside the case 220 as shown in embodiments of FIGS. 3A and 3B. In further embodiments, the choke 240 is located in both the manifold 230 and the case 220 of the electrostatic painting device 110.

The fluid tip 210 is connected to the choke 240 in the case 220 or the resistance 24 and discharges the negatively charged paint particles to the booth environment 100. In some embodiments, the voltage value at the fluid tip 210 may vary from 0 V to 100 kV DC and the DC current at the fluid tip 210 may exhibit a maximum value of 200 µA which may vary from 0 µA to 200 µA or other higher value depending on the specification of the electrostatic painting device 110. The numerical values provided are examples and are based on the parameters of the components used in the painting device. The specific current value and the voltage value as well as the inductance value of the choke may vary and are not necessarily limited to the numerical values given as examples.

Figure 6A:
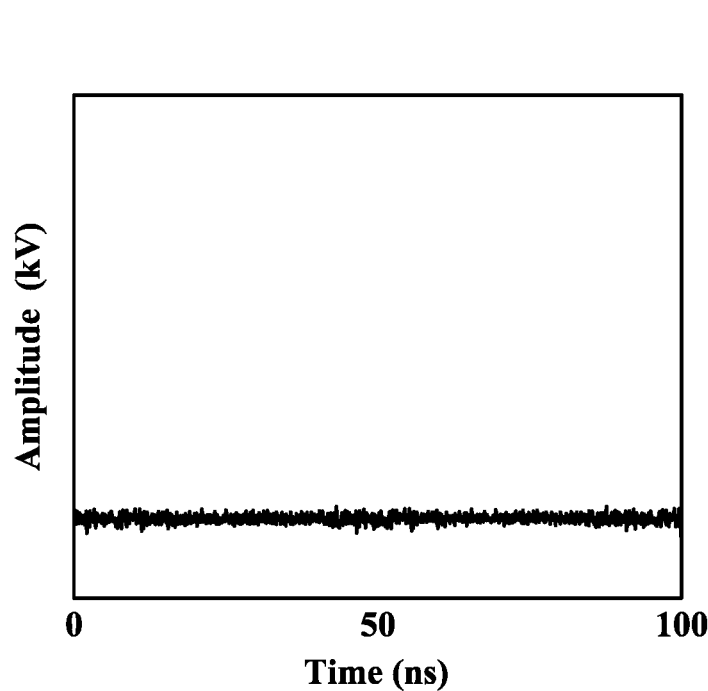
FIG. 6A is a graph showing electromagnetic emissions reduced using an electrostatic painting device having a choke, in accordance with one or more embodiments.
Figure 6B:
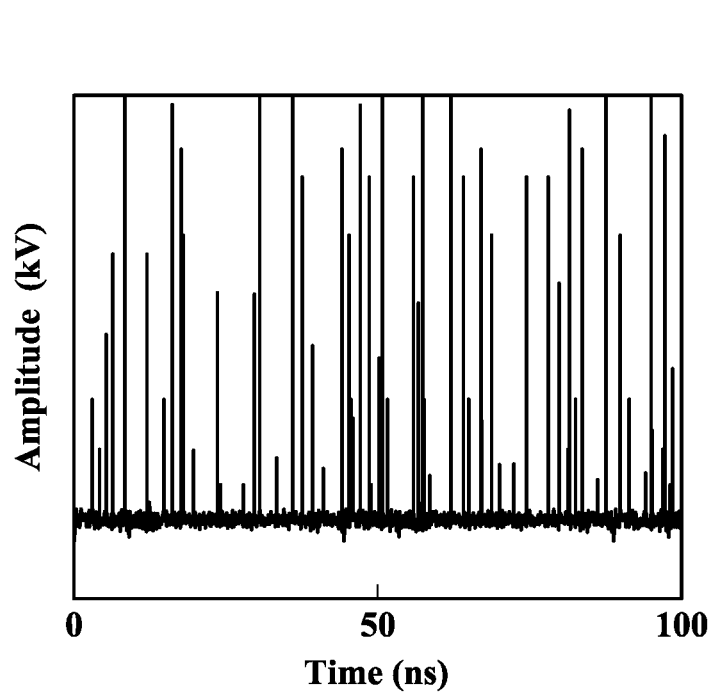
FIG. 6B is a graph showing electromagnetic emissions present using an electrostatic painting device without a choke.

FIGS. 6A and 6B are graphs showing the absence (FIG. 6A) and presence (FIG. 6B) of the electromagnetic emissions in an experimental environment using a loop antenna to detect the electromagnetic emissions. FIG. 6A shows a case where the choke 240 is incorporated in the electrostatic painting device 110 and FIG. 6B shows a case in a conventional electrostatic painting device without the choke. The experiment was conducted using a loop antenna with no ground reference and no differential inputs to prevent damaging the scope. Accordingly, the captures shown in these figures are useful for showing presence and absence of the AC emissions without any values.

FIG. 6A shows a graph 600 of a voltage outputted using a choke 240 in the electrostatic painting device 110. The graph 600 shows that the electromagnetic emissions or the AC components are reduced or eliminated. In particular, as mentioned previously, the AC components or the non-DC current components is caused by the cascade. The choke 240 here which is a current activated component is limiting the non-DC component in the current from the cascade and in doing so reduces the non-DC voltage component as seen at the fluid tip 210. Current tries to rise but the choke 240 counteracts the rise in current, consequently preventing the cascade from discharging, thereby keeping the DC potential at the fluid tip relatively constant. In sum, the choke 240 according to the present disclosure effectively reduces or eliminates the micro-discharges during the electrostatic painting process. Therefore, the risk of damaging microelectronic circuitry in the chassis during the electrostatic painting process can be avoided.

FIG. 6B shows a graph 602 of a voltage outputted without using a choke 240 in the electrostatic painting device 110. The graph 602 shows that the AC outbursts are detected with each discharge of the spray gun. The graph shows the electromagnetic pulses exist in a spurious random manner in the booth environment 100. A typical spike of the electromagnetic emissions has a rising edge of 2 ns followed by an exponential decay. A 2 ns rising edge yields a prominent frequency spike at 500 MHz. The amplitude of the spike may be in the range between zero volts and a few hundred volts, for example. As seen from FIG. 6B, without the choke 240 in the electrostatic painting device 110, the AC emissions from the device 110 can induce significant energy to the microelectronic circuits and damage their functions.

The various embodiments described above can be combined to provide further embodiments. All of the U.S. patent applications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a high voltage source that includes an output that provides a direct current (DC) voltage that includes a DC component and a non-DC component, the high voltage source having at least one capacitor, the non-DC components generated based on the discharge of at least one capacitor of the high voltage source;
   a conductive fluid tip electrically coupled to the output of the high voltage source, in operation, the conductive fluid tip sprays atomized paint particles that are charged using the outputted DC voltage; and
   a choke including an input and an output, the input of the choke electrically coupled to the output of the high voltage source, and the output of the choke electrically coupled to the conductive fluid tip, the choke operable to reduce the non-DC component in the DC voltage provided to the conductive fluid tip to prevent the non-DC components from discharging from the device.

2. The device of claim 1, wherein the choke is a hash choke.

3. The device of claim 2, wherein the hash choke has an inductance between 0.1 millihenries and 10 millihenries.

4. The device of claim 2, wherein the choke includes a core formed with powdered iron.

5. The device of claim 1, wherein the choke is a radio frequency choke.

6. The device of claim 1, wherein the choke includes at least one inductor having a number of windings that provide an inductance value between 0.1 millihenries and 10 millihenries.

7. The device of claim 1, wherein the high voltage source provides a negative DC voltage relative to a grounded object to be painted.

8. The device of claim 1, wherein the high voltage source provides a negative DC voltage of 60 kV to 140 kV relative to a grounded object to be painted.

9. The device of claim 1, wherein the high voltage source includes a voltage multiplier.

10. The device of claim 9, wherein the voltage multiplier includes the at least one capacitor, and the non-DC component is created based on a discharge of the capacitor of the voltage multiplier.

11. The device of claim 10, wherein the non-DC component includes at least one of electromagnetic emissions, AC currents, or micro-discharges.

12. The device of claim 11, wherein the choke reduces or eliminates the at least one of electromagnetic emissions, AC currents, or micro-discharges.

13. The device of claim 11, wherein the non-DC component includes frequencies within a range of 10 MHz to 3000 MHz.

14. The device of claim 1, wherein the high voltage source comprises:
   a DC-to-DC converter electrically coupled to a voltage multiplier, the DC-to-DC converter operable to convert the DC voltage from one voltage level to another voltage level.

15. The device of claim 14, wherein the device is an electrostatic painting gun.

16. The device of claim 1, wherein the conductive fluid tip is a first conductive fluid tip, and the device further comprises a second conductive fluid tip proximate to the first conductive fluid tip, the second conductive fluid tip being electrically coupled to the output of the choke.

17. The device of claim 16, wherein the device is an automated electrostatic painting robot.

18. The device of claim 1, further comprising a tube surrounding the choke, the choke being potted inside the tube and an insulating material filling the void between the tube and the choke.

19. A device, comprising:

a high voltage source that includes an output that provides a DC voltage that includes a DC component and a non-DC component;

a first fluid tip electrically coupled to the output of the high voltage source, in operation, the first fluid tip sprays atomized paint particles that are charged using the outputted DC voltage;

a second fluid tip proximate to the first fluid tip and electrically coupled to the output of the high voltage source, in operation, the second fluid tip sprays atomized paint particles that are charged using the outputted DC voltage;

a first choke connected in series with the first fluid tip; and a second choke connected in series with the second fluid tip, wherein the first and second choke including an input and an output, the input of the first and second choke electrically coupled to the output of the high voltage source, and the output of the first and second choke electrically coupled to the first and second fluid tip, respectively.

20. A method of electrostatic painting, comprising:

providing, using a high voltage source, a DC voltage that includes a DC component and unintended non-DC current components, the high voltage source having at least one capacitor, the non-DC current components generated based on the discharge of at least one capacitor of the high voltage source;

limiting the non-DC current components with a choke electrically coupled to the high voltage source;

providing the DC voltage with the reduced non-DC current components to a conductive fluid tip that, in operation, discharges atomized paint particles to apply paint to an object.

21. The method of claim 20, wherein the conductive fluid tip is a first conductive fluid tip, the method further comprising:

providing the DC voltage with the reduced non-DC current components to a second conductive fluid tip proximate to the conductive fluid tip that, in operation, discharges atomized paint particles to apply paint to the object.

* * * * *